Figure 2:
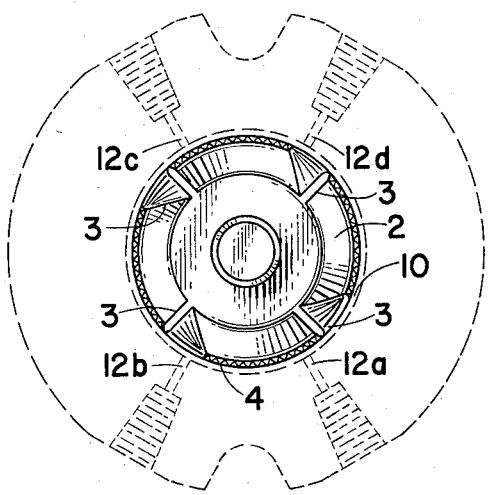

Oct. 21, 1958     J. F. GURLEY, JR., ET AL     2,857,144

MIXING DEVICE

Filed May 15, 1956

INVENTORS
JESSE F. GURLEY, JR.
HERMAN N. WOEBCKE, JR.

BY

ATTORNEY

United States Patent Office 2,857,144
Patented Oct. 21, 1958

2,857,144

MIXING DEVICE

Jesse Fred Gurley, Jr., and Herman Nicholas Woebcke, Jr., St. Louis, Mo., assignors to Mobay Chemical Company, St. Louis, Mo., a corporation of Delaware Application May 15, 1956, Serial No. 585,077

2 Claims. (Cl. 259—7)

This invention relates to a mixing device for the production of polyurethane plastics. More particularly, the invention is concerned with a mixing device which makes it possible to produce polyurethane plastics from their components on an intermittent or "interruptable-cycle" basis.

In French Patent No. 1,074,713, there is described a process for producing polyurethane plastics which involves bringing together a compound containing reactive hydrogen, a polyisocyanate and a component influencing the reaction forming said polyurethane plastics in an enclosed mixer, at least the reaction-influencing component being introduced at a pressure substantially higher than that in said mixer. In the above patent, there is also described an apparatus for carrying out the production of polyurethane plastics, said apparatus comprising means through which the components used in the manufacture of said polyurethane plastics are brought together in an enclosed mixer, at least one of said means comprising an injector operating at a pressure substantially higher than that in said mixer and in outlet means through which the final mixture is discharged in the liquid state.

The process and apparatus described in the above-identified patent give excellent results in the continuous production of polyurethane plastics. However, when operated intermittently, the apparatus must be flushed with a solvent after each "shot" since otherwise the reaction mixture remaining in the mixing chamber clogs the apparatus by solidification. The necessity for repeated and costly flushing of the mixer after each "shot" is, of course, entirely unsatisfactory for production-line techniques of manufacture.

It is an object of the present invention to provide a mixing device for the production of polyurethane plastics, the design of which is such that the volume of reactive mixture contained in the mixing chamber at any time of the operation is extremely small. Another object is to provide a mixing device which is self-cleaning. A further object is to provide a mixing device which is particularly suitable for the intermittent production of polyurethane plastics. Still further objects will appear hereinafter.

With the above and other objects in view, the invention provides a mixing device which comprises a stirrer having a cylindrical section provided with a plurality of obliquely directed vanes, a conical section and a tapered section, and a mixing chamber shaped to allow only small clearance between its walls and said cylindrical and conical sections of the stirrer but to allow substantial clearance between its walls and said tapered section of the stirrer, said mixing chamber having an exit orifice opposite the tip of said conical section of the stirrer and having inlet orifices opposite said tapered section of the stirrer to introduce the components to be mixed into the free space between the walls of said mixing chamber and said tapered section of the stirrer.

Figure 1:
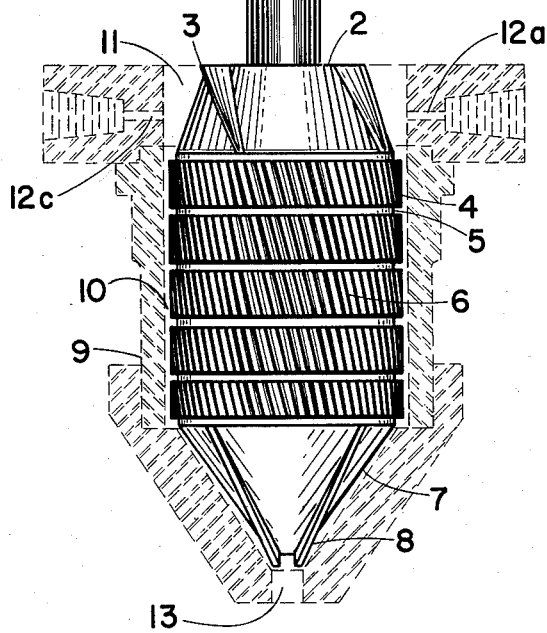

One specific embodiment of the invention will now be described in detail, by way of example, with reference to the accompanying drawings, in which:

Figure 1 is a longitudinal section through a mixing device constructed in accordance with the present invention, and Figure 2 is a cross sectional view thereof.

Referring more particularly to the drawings, wherein similar numerals refer to similar parts, numeral 9 designates a mixing chamber provided with inlet orifices 12a, 12b, 12c and 12d, and exit orifice 13. Mounted in the mixing chamber 9 is a stirrer which comprises the shaft 1, the tapered section 2 with the pumping vanes 3, the cylindrical section 4 with the relief grooves 5 and the mixing vanes or tooth-like projectors 6, and the conical section 7 with the pumping vanes 8. As illustrated in the drawings, the clearance 10 between the mixing chamber 9 and the sections 4 and 7 of the stirrer is relatively small while substantial clearance in the form of the free space 11 is provided between the mixing chamber 9 and the tapered section 2.

The pumping vanes 3 on the tapered section 2 of the stirrer are optional. In order to exercise pumping action, these pumping vanes are pitched. Generally the pitch will be at a 5° to 30° angle with the central line of the shaft 1.

The mixing vanes 6 are also pitched in such manner that rotation will cause a pumping action toward the exit orifice 13. Although the angle at which the mixing vanes are pitched is not critical, the angle will preferably be within the range of 5° and 30°. The mixing vanes are preferably so fashioned as to include an angle of 15° to 45° between adjacent blades. The number of the mixing vanes may vary within wide limits. Thus, on a mixer having a nominal 2-inch diameter, the number of vanes may range between 40 and 150.

The mixing vanes 6 may be interrupted by transverse relief grooves 5 but the presence of such relief grooves on the cylindrical section 4 of the stirrer is not mandatory.

The conical section of the stirrer is preferably provided with the pumping vanes 8 in order to assure complete evacuation of the mixing chamber, said pumping vanes being pitched at a 5° to 30° angle.

The clearance between the walls of the mixing chamber and the cylindrical and conical sections of the stirrer should be very small. In general, it will be within the range of 0.006 to 0.1 inch.

In operation, the components of the polyurethane to be produced are introduced through the inlet orifices 12a, 12b, 12c and 12d into the space 11. The initial mixture formed in the space 11 flows to the mixing vanes 6 which intensify by their mixing action the uniformity of the mixture. At the same time, the mixture is pumped toward the conical section 7 and from there to the exit orifice 13. The flow rate of the mixture is increased by the action of the pumping vanes 3 and 8.

When the operation of the mixing device is discontinued by shutting off the flow of the components to be mixed, the relatively small amount of mixture contained in the mixing chamber at any time of the operation will almost completely be pumped out within a very short time interval so that turning off the flow of the components results in an almost immediate shut down of the exit orifice without "after-flow" or "after-dripping." A brief flushing with compressed air at this point of the cycle will aid further in completely evacuating the chamber.

The number of revolutions made by the stirrer may be varied within wide limits, but usually it will be caused to make about 500 to 5000 revolutions per minute.

The mixing device of the instant invention yields particularly uniform and valuable mixtures if the component containing reactive hydrogen, such as the hydroxyl polyester, is pumped in a substantially continuous stream into the space 11, as for example by means of a gear pump, and if the polyisocyanate component and the activator mixture, if any, are injected intermittently into the space 11 at a pressure substantially higher than that in the mixing chamber 9. In this case, at least one of the inlet orifices 12 is a nozzle adapted to inject a component under high pressure into the mixing chamber 9. When introduced in this manner, which is described in greater detail in the above-identified French patent, the components form an initial mixture which upon passage of the mixing device of the invention will have a maximum degree of uniformity and result in a polyurethane plastic of particularly desirable properties.

The mixing device of the invention may be used in the production of various types of polyurethane plastics, but particular advantages are derived from the invention in the intermittent production of polyurethane foam. Thus, if relatively small objects of polyurethane foam, such as crash pads, are to be made, the mixing device of the invention can be used to fill a series of molds with a liquid foamable mixture which will form a solid polyurethane foam when allowed to react in said molds. These molds may be placed one after the other under the mixing device of the invention by production-line techniques, the flow of the components being turned on and turned off in the same rhythm as the molds are placed under the mixing device and taken away therefrom. Owing to the low inventory and self-cleaning characteristics of the mixing device of the invention, the loss of material in the periods during which the molds are changed will be very small.

As many apparently widely different embodiments of this invention may be made without departing from the spirit and scope thereof, it is to be understood that this invention is not limited to the specific embodiments thereof except as defined in the appended claims.

What is claimed is:

1. An apparatus for mixing liquids comprising, in combination, a mixing chamber having a substantially cylindrical portion terminating at one end in a substantially conical portion, and agitating means in said chamber comprising a substantially cylindrical portion and two substantially frusto-conically shaped ends, said cylindrical portion having a plurality of annular rows of tooth-like projections separated by annular grooves, means for introducing liquid into said cylindrical portion of said chamber adjacent one substantially frusto-conically shaped end and means for passage of liquid from said chamber adjacent the other end of said agitating means, said mixing chamber being substantially concentric with the cylindrical portion and that end portion adjacent said means for passage of liquid from said chamber, and pumping vanes comprising obliquely extending ribs on both frusto-conically shaped ends of the agitating means.

2. An agitator comprising a shaft carrying a stirrer having a substantially cylindrical portion and two substantially frusto-conically shaped ends, each of said ends having pumping vanes comprising obliquely-extending ribs, said cylindrical portion having a plurality of annular rows of tooth-like projections separated by annular grooves.

References Cited in the file of this patent

UNITED STATES PATENTS

| 1,017,286 | Du Pont | Feb. 13, 1912 |
| 1,487,208 | Cooke et al. | Mar. 18, 1924 |
| 2,453,088 | Dulmage | Nov. 2, 1948 |
| 2,573,440 | Henning | Oct. 30, 1951 |
| 2,754,542 | Henning et al. | July 17, 1956 |

FOREIGN PATENTS

| 495,107 | Great Britain | Nov. 8, 1938 |
| 1,074,713 | France | Apr. 7, 1954 |